United States Patent [19]

Skinner

[11] Patent Number: 5,556,148
[45] Date of Patent: Sep. 17, 1996

[54] ATTACHMENT DEVICE FOR MOTOR CRANES

[76] Inventor: Richard L. Skinner, 4230 E. Pakes Rd., Stanton, Mich. 48888

[21] Appl. No.: 314,096

[22] Filed: Sep. 28, 1994

[51] Int. Cl.⁶ .................................. B60P 1/48; B66C 1/10
[52] U.S. Cl. .......................... 294/67.1; 254/8 B; 254/124; 294/82.1
[58] Field of Search .................................. 294/67.1, 67.2, 294/67.21, 67.5, 81.3, 82.1–82.15; 254/8 B, 124; 414/607, 608, 626, 589

[56] References Cited

U.S. PATENT DOCUMENTS

| | | | |
|---|---|---|---|
| 1,512,149 | 10/1924 | Wagner | 294/82.11 |
| 2,208,221 | 7/1940 | McCullough | 254/124 |
| 2,603,522 | 7/1952 | Stair | 294/82.14 X |
| 2,700,568 | 1/1955 | Meili | 294/82.12 X |
| 2,814,394 | 11/1957 | Witcher | 254/8 B X |
| 3,001,634 | 9/1961 | Bauder | 294/82.1 X |
| 3,759,399 | 9/1973 | Glass et al. | 414/607 X |
| 4,133,514 | 1/1979 | Anderson | 254/124 |
| 4,497,469 | 2/1985 | Barnhouse | 254/8 B |
| 5,261,640 | 11/1993 | Yuan | 254/8 B |

Primary Examiner—Johnny D. Cherry

[57] ABSTRACT

A new and improved attachment device for motor cranes with a securement portion having a plurality of apertures formed therethrough. The apertures align with apertures formed in the motor crane for securement thereto. An intermediate portion extends downwardly from the securement portion. An extension portion is integral with the intermediate portion. The extension portion has an aperture formed therethrough. A hook portion is rotatably and pivotally coupled with the aperture formed through the extension portion. A chain securement portion is adapted for coupling with hook portion. The chain securement portion is also adapted for securement to the engine.

2 Claims, 4 Drawing Sheets

ATTACHMENT DEVICE FOR MOTOR CRANES

BACKGROUND OF THE INVENTION

1. Field of the Invention

The present invention relates to an attachment device for motor cranes and more particularly pertains to attaching to an arm of a motor crane to facilitate lifting engines out for repair or replacement with an attachment device for motor cranes.

2. Description of the Prior Art

The use of swivel hooks is known in the prior art. More specifically, swivel hooks heretofore devised and utilized for the purpose of attaching to engines and the like are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,224,722 to Mikosz et al. discloses a swivel hook assembly.

U.S. Pat. No. 3,433,459 to Logan discloses a load handling apparatus.

U.S. Pat. No. 3,751,097 to Jones et al. discloses an adjustable engine lift.

U.S. Pat. No. 4,099,694 to Horwitz discloses a swivel hook assembly.

U.S. Pat. No. 250,453 to Horwitz discloses the ornamental design for a swivel hook.

While these devices fulfill their respective, particular objective and requirements, the aforementioned patents do not describe an attachment device for motor cranes for attaching to an arm of a motor crane to facilitate lifting engines out for repair or replacement.

In this respect, the attachment device for motor cranes according to the present invention substantially departs from the conventional concepts and designs of the prior art, and in doing so provides an apparatus primarily developed for the purpose of attaching to an arm of a motor crane to facilitate lifting engines out for repair or replacement.

Therefore, it can be appreciated that there exists a continuing need for a new and improved attachment device for motor cranes which can be used for attaching to an arm of a motor crane to facilitate lifting engines out for repair or replacement. In this regard, the present invention substantially fulfills this need.

SUMMARY OF THE INVENTION

In the view of the foregoing disadvantages inherent in the known types of swivel hooks now present in the prior art, the present invention provides an improved attachment device for motor cranes. As such, the general purpose of the present invention, which will be described subsequently in greater detail, is to provide a new and improved attachment device for motor cranes and method which has all the advantages of the prior art and none of the disadvantages.

To attain this, the present invention essentially comprises a securement portion having a first end and a second end. The first end has a plurality of apertures formed therethrough. The apertures align with apertures formed in the motor crane for securement thereto. The device contains an intermediate portion having a first end and a second end. The first end is integral with the second end of the securement portion. The intermediate portion extends downwardly from the securement portion. The device contains an extension portion having a first end and a second end. The first end is integral with the second end of the intermediate portion. The second end has an aperture formed therethrough. The device contains a hook portion having an upper inverted U-shaped piece. The inverted U-shaped piece has two upwardly extending portions and a lower portion therebetween. The two upwardly extending portions have an aperture formed therethrough. The aperture aligns with the aperture formed through the second end of the extension portion and pivotally couples the two upwardly extending portions therewith by a nut and bolt. The lower portion has an aperture formed therethrough. A lower U-shaped piece has two downwardly extending portions and an upper portion therebetween. The upper portion had an aperture formed therethrough. The aperture aligns with the aperture formed in the lower portion of the inverted U-shaped piece and is rotatably coupled therewith by a double bolt. The two downwardly extending portions have an aperture formed therethrough. A hook has a securement end and a hooked end. The securement end has an aperture formed therethrough. The aperture aligns with the aperture formed through the two downwardly extending portions of the lower U-shaped piece and is pivotally coupled therewith by nut and bolt. The device contains a chain securement portion having a plurality of chain links theresecured. The chain securement portion is adapted for coupling with the hooked end of the hook of the hook portion. The plurality of chain links have an engine support portion thereattached. The engine support portion is adapted for securement to the engine.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved attachment device for motor cranes which has all the advantages of the prior art swivel hooks and none of the disadvantages.

It is another object of the present invention to provide a new and improved attachment device for motor cranes which may be easily and efficiently manufactured and marketed.

It is a further object of the present invention to provide a new and improved attachment device for motor cranes which is of durable and reliable construction.

An even further object of the present invention is to provide a new and improved attachment device for motor cranes which is susceptible of a low cost of manufacture with regard to both materials and labor, and which accordingly is then susceptible of low prices of sale to the consuming public, thereby making such an attachment device for motor cranes economically available to the buying public.

Still yet another object of the present invention is to provide a new and improved attachment device for motor cranes which provides in the apparatuses and methods of the prior art some of the advantages thereof, while simultaneously overcoming some of the disadvantages normally associated therewith.

Even still another object of the present invention is to provide a new and improved attachment device for motor cranes for attaching to an arm of a motor crane to facilitate lifting engines out for repair or replacement.

Lastly, it is an object of the present invention to provide a new and improved attachment device for motor cranes with a securement portion having a plurality of apertures formed therethrough. The apertures align with apertures formed in the motor crane for securement thereto. An intermediate portion extends downwardly from the securement portion. An extension portion is integral with the intermediate portion. The extension portion has an aperture formed therethrough. A hook portion is rotatably and pivotally coupled with the aperture formed through the extension portion. A chain securement portion is adapted for coupling with hook portion. The chain securement portion is also adapted for securement to the engine.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
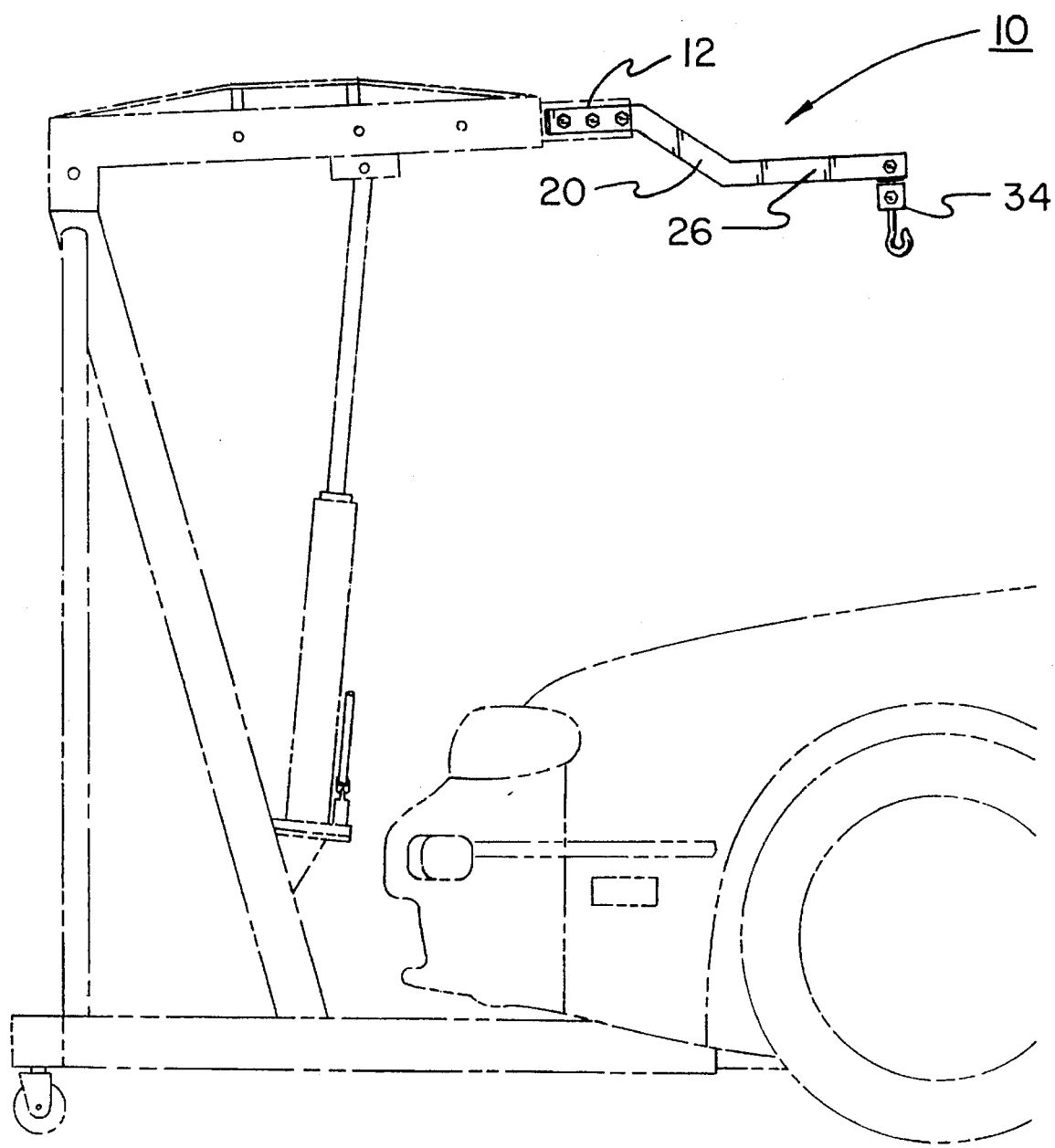
FIG. 1 is a perspective view of the preferred embodiment of the attachment device for motor cranes constructed in accordance with the principles of the present invention.
Figure 2:
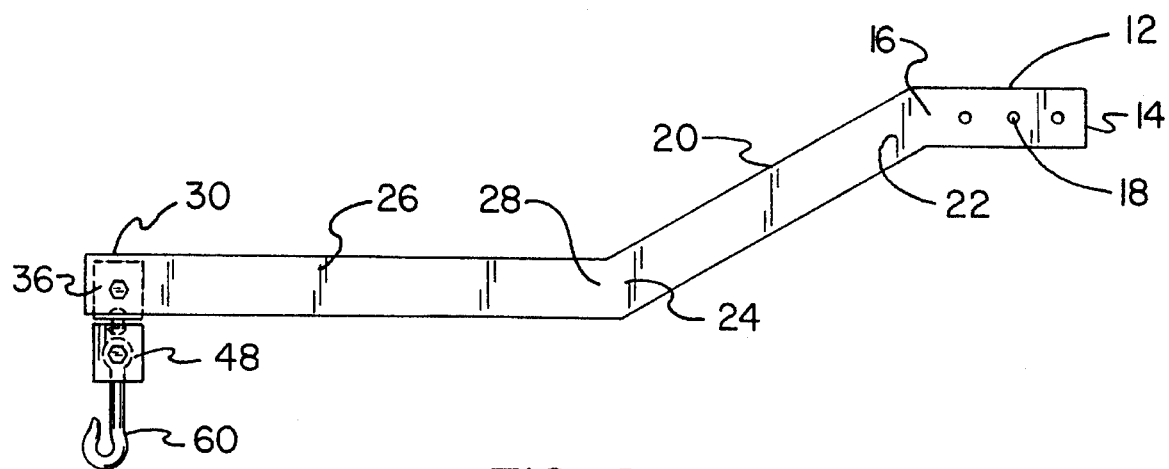
FIG. 2 is a side elevational view of the present invention.
Figure 3:
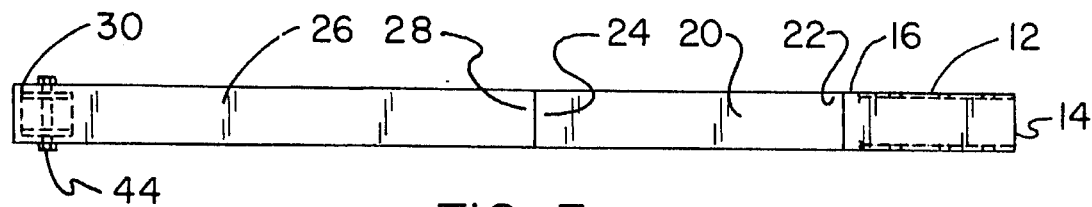
FIG. 3 is a plan view of the preferred embodiment of the present invention.
Figure 4:
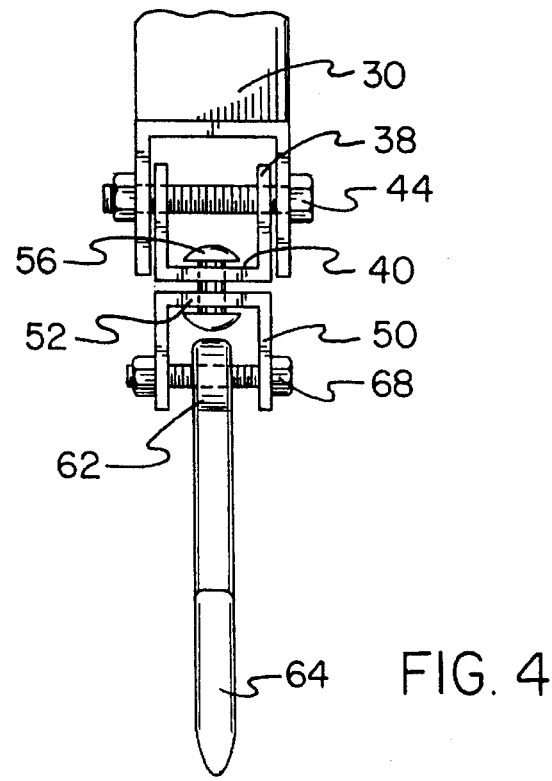
FIG. 4 is a front elevational view of the present invention.
Figure 5:
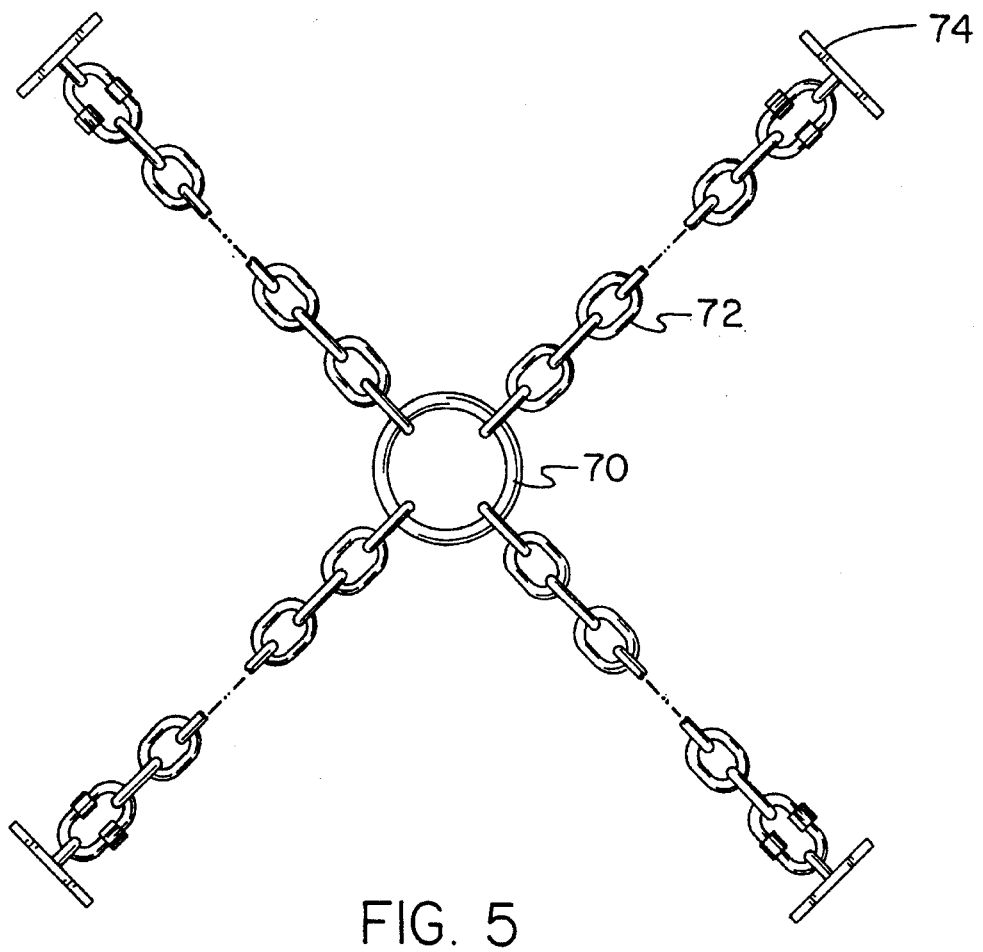
FIG. 5 is a perspective view of the chain portion of the present invention.
Figure 6:
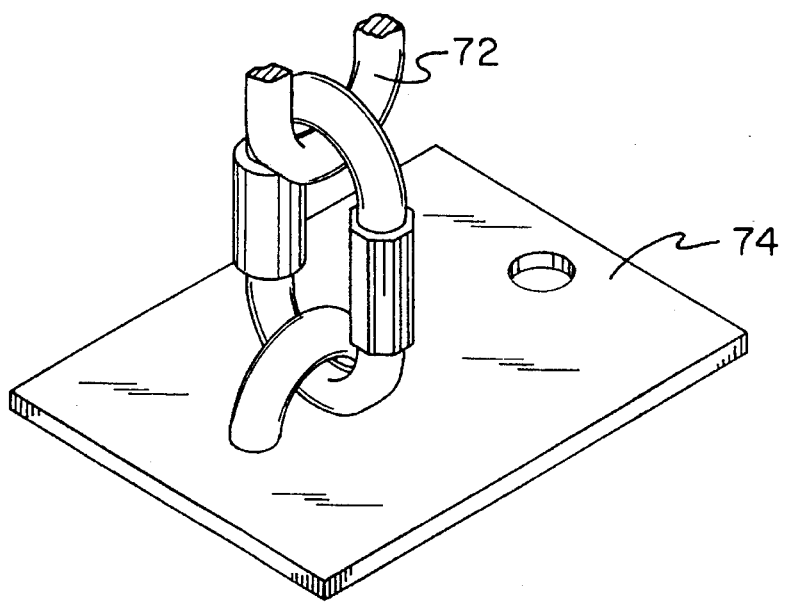
FIG. 6 is an enlarged perspective view of the engine attachment portion of the present invention.
Figure 7:
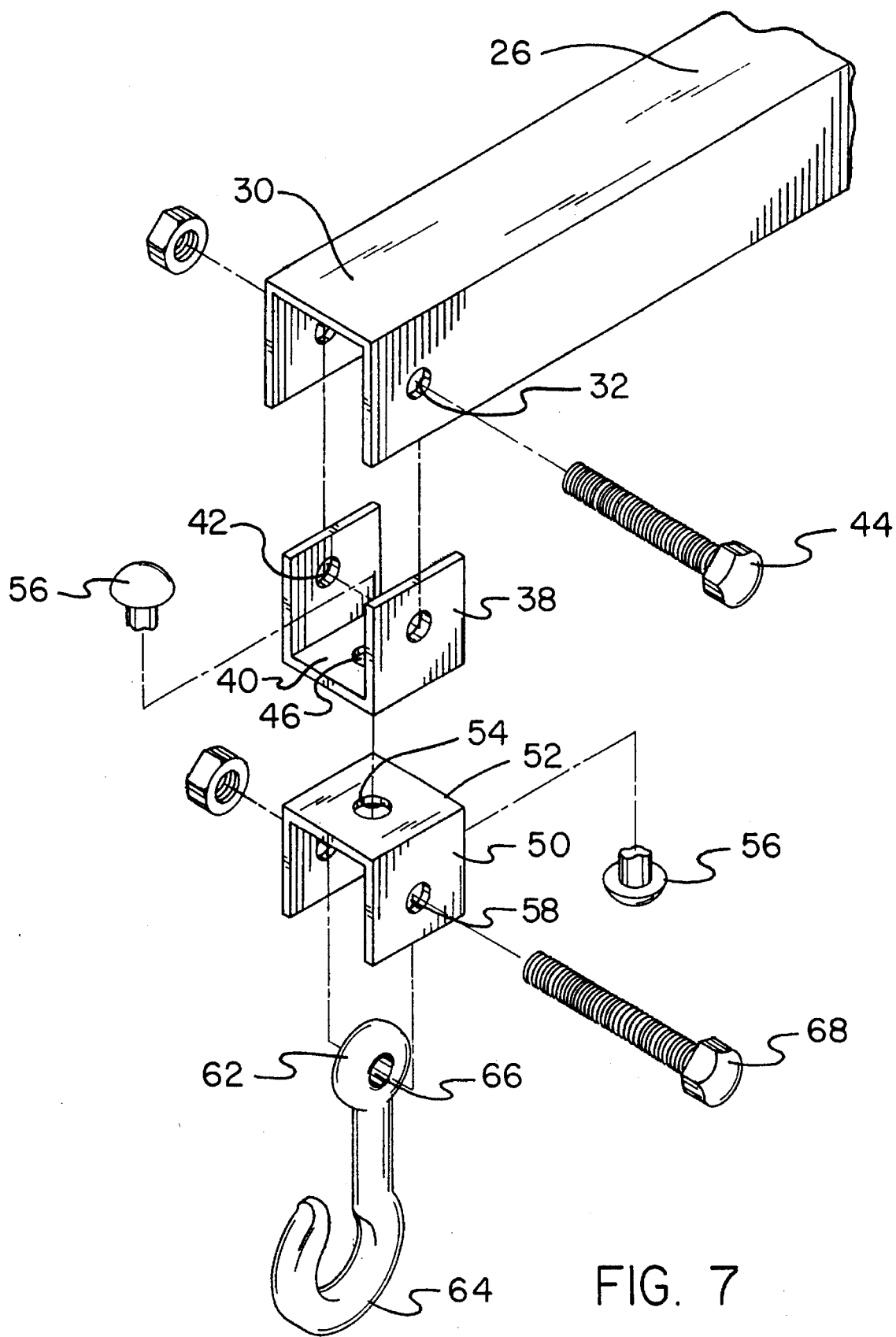
FIG. 7 is an exploded perspective view of the hook portion of the present invention.

With reference now to the drawings, and in particular, to FIG. 1 thereof, the preferred embodiment of the new and improved attachment device for motor cranes embodying the principles and concepts of the present invention and generally designated by the reference number 10 will be described.

Specifically, it will be noted in the various Figures that the device relates to a new and improved attachment device for motor cranes for attaching to an arm of a motor crane to facilitate lifting engines out for repair or replacement. In its broadest context, the device consists of a securement portion, an intermediate portion, an extension portion, a hook portion and a chain securement portion.

The device 10 contains a securement portion 12 having a first end 14 and a second end 16. The first end 14 has a plurality of apertures 18 formed therethrough. The apertures 18 align with apertures formed in the motor crane for securement thereto. The securement portion 12 is preferably constructed of two inch square tubing. The plurality of apertures 18 in the preferred embodiment is three. The length of the securement portion 12 in the preferred embodiment is four inches.

The device 10 contains an intermediate portion 20 having a first end 22 and a second end 24. The first end 22 is integral with the second end 16 of the securement portion 12. The intermediate portion 20 extends downwardly from the securement portion 12. As with the securement portion 12, the intermediate portion 20 is preferably constructed of two inch square tubing. The preferable length of the intermediate portion 20 is seven inches. Because the intermediate portion 20 angles downward, the user is better able to move the device 10 closer to the engine.

The device 10 contains an extension portion 26 having a first end 28 and a second end 30. The first end 28 is integral with the second end 24 of the intermediate portion 20. The second end 30 has an aperture 32 formed therethrough. As with the securement portion 12 and the intermediate portion 20, the extension portion 26 is preferably constructed of two inch square tubing. The preferable length of the extension portion 26 is twelve and one-half inches.

The device 10 contains a hook portion 34 having an upper U-shaped piece 36. The U-shaped piece 36 has two upwardly extending portions 38 and a lower portion 40 therebetween. The two upwardly extending portions 38 have an aperture 42 formed therethrough. The aperture 42 aligns with the aperture 32 formed through the second end 30 of the extension portion 26 and pivotally couples the two upwardly extending portions 38 therewith by a nut and bolt 44. The lower portion 40 has an aperture 46 formed therethrough. A lower U-shaped piece 48 has two downwardly extending portions 50 and an upper portion 52 therebetween. The upper portion 52 had an aperture 54 formed therethrough. The aperture 54 aligns with the aperture 46 formed in the lower portion 40 of the U-shaped piece 36 and is rotatably coupled therewith by a double bolt 56. The two downwardly extending portions 50 have an aperture 58 formed therethrough. A hook 60 has a securement end 62 and a hooked end 64. The securement end 62 has an aperture 66 formed therethrough. The aperture 66 aligns with the aperture 58 formed through the two downwardly extending portions 50 of the lower U-shaped piece 48 and is pivotally coupled therewith by nut and bolt 68. Because the hook portion 34 can rotate and pivot, the user is able to maneuver the engine onto an engine service mount without the aid of more people.

The device 10 contains a chain securement portion 70 having a plurality of chain links 72 theresecured. The chain securement portion 70 is adapted for coupling with the hooked end 64 of the hook 60 of the hook portion 34. The plurality of chain links 72 have an engine support portion 74 thereattached. The engine support portion 74 is adapted for securement to the engine. The preferable amount of chain links 72 is four. Presently, there are only two linked chains on the market. The existence of four chain links 72 provides a safer means of removing the engine.

The present invention is an angled extension with a swiveling/rotating hook. The present invention is designed to be attached to the arm of a 2- to 4-ton motor crane. The present invention facilitates lifting vehicle engines out for repair or replacement.

The product consists of an extension made of 2-inch-square steel tubing. This extension is angled first in one direction, then less sharply in the opposite direction so that when the extension is attached to a motor crane arm, the end with the hook can extending out horizontally over the engine. The hook hangs from a horizontal bolt attached to a 3-sided bracket in the shape of an inverted U. This bracket is secured by means of a 1¾-inch button to another bracket above it which is U-shaped, and is mounted to the steel extension via a horizontal ½-inch bolt.

The hook's mounting assembly allows the user to move an engine back and forth as well as turn it for much easier removal. The angled extension enables the crane to lift the motor straight up instead of raising it in an angle. This avoids damaging the engine hood, fenders, radiator, and other components. Without this device, the hold and radiator would have to be removed in many cases. Many people put their crane on blocks to get a better angle on the lift, but this is dangerous. This product provides a safer, more convenient solution.

The present invention allows mechanics to do high quality work in less time, with less damage to the vehicle they are working on. This lowers the cost to the consumer.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An attachment device for motor cranes for attaching to an arm of a motor crane to facilitate lifting engines out for repair or replacement comprising, in combination:

a securement portion having a first end and a second end, the first end having a plurality of apertures formed therethrough, the apertures aligning with apertures formed in the motor crane for securement thereto;

an intermediate portion having a first end and a second end, the first end of the intermediate portion integral with the second end of the securement portion, the intermediate portion extending downwardly from the securement portion;

an extension portion having a first end and a second end, the first end of the extension portion integral with the second end of the intermediate portion, the second end of the extension portion having an aperture formed therethrough;

a hook portion having an upper U-shaped piece, the U-shaped piece having two upwardly extending portions and a lower portion therebetween, the two upwardly extending portions having an aperture formed therethrough, the aperture of the two upwardly extending portions aligning with the aperture formed through the second end of the extension portion and pivotally coupled therewith by a nut and bolt, the lower portion having an aperture formed therethrough, a lower U-shaped piece having two downwardly extending portions and an upper portion therebetween, the upper portion having an aperture formed therethrough, the aperture of the upper portion aligning with the aperture formed in the lower portion of the U-shaped piece and rotatably coupled therewith by a double bolt, the two downwardly extending portions having an aperture formed therethrough, a hook having a securement end and a hooked end, the securement end having an aperture formed therethrough, the aperture of the securement end aligning with the aperture formed through the two downwardly extending portions of the lower U-shaped piece and pivotally coupled therewith by a nut and bolt;

a chain securement portion having a plurality of chain links theresecured, the chain securement portion coupling with the hooked end of the hook of the hook portion, the plurality of chain links having an engine support portion thereattached, the engine support portion securable to the engine.

2. An attachment device for motor cranes for attaching to an arm of a motor crane to facilitate lifting engines out for repair or replacement comprising, in combination:

a securement portion having a plurality of apertures formed therethrough, the apertures aligning with apertures formed in the motor crane for securement thereto;

an intermediate portion extending downwardly from the securement portion;

an extension portion integral with the intermediate portion, the extension portion having an aperture formed therethrough;

a hook portion rotatably and pivotally coupled with the aperture formed through the extension portion, the hook portion having an upper U-shaped piece, the U-shaped piece having two upwardly extending portions and a lower portion therebetween, the two upwardly extending portions having an aperture formed therethrough, the aperture of the two upwardly extending portions aligning with the aperture formed through the extension portion and pivotally coupled therewith by a nut and bolt, the lower portion having an aperture formed therethrough, a lower U-shaped piece having two downwardly extending portions and an upper portion therebetween, the upper portion having an aperture formed therethrough, the aperture of the upper portion aligning with the aperture formed in the lower portion of the U-shaped piece and rotatably coupled therewith by a double bolt, the two downwardly extending portions having an aperture formed therethrough, a hook having a securement end and a hooked end, the securement end having an aperture formed therethrough, the aperture of the securement end aligning with apertures formed through the two downwardly extending portions of the lower U-shaped piece and pivotally coupled therewith by a nut and bolt;

a chain securement portion adapted for coupling with the hook portion and for securement to the engine.

* * * * *